United States Patent Office 2,876,780
Patented Mar. 10, 1959

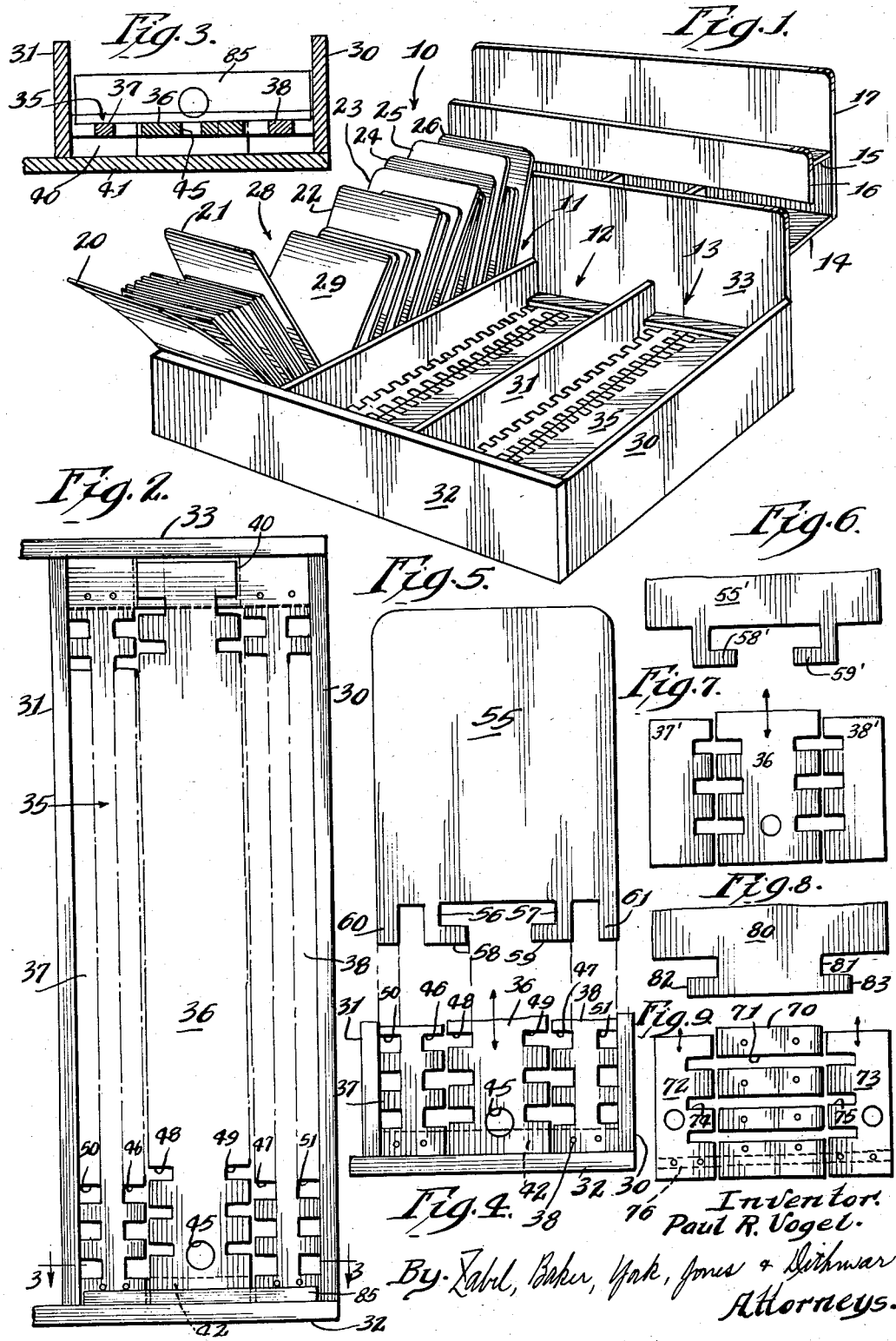
March 10, 1959 — P. R. VOGEL — 2,876,780
FILING AND DISPLAY DEVICE
Filed Jan. 24, 1957

2,876,780

FILING AND DISPLAY DEVICE

Paul R. Vogel, Flagler Beach, Fla.

Application January 24, 1957, Serial No. 636,012

8 Claims. (Cl. 129—16)

This invention relates to a filing and display device.

One object of the invention is to provide a filing and display device which includes a series of separate pockets for the reception of materials to be filed or displayed. Each pocket is defined in part by front and rear members, here called index members, the two members having a hinged relation with the bottom of the device so that the upper portions thereof may be spread apart to permit ready inspection, removal, or insertion of materials.

Another object of the invention is to provide a device of this character wherein the pocket-defining index members may be adjustably spaced longitudinally of the device in order to permit variations in the size of a particular pocket.

Another object of the invention is to provide a device of this character having a bottom designed to mount detachable index members in a hinged manner and to lock them in position to prevent accidental removal.

Still another object of the invention is to provide a device of this character which is extremely flexible from the standpoint of size. An individual device may be made in any reasonable length, and a plurality of such individual devices may be arranged side-by-side to provide filing and display capacity in virtually any desired amount.

The device of the invention has been found particularly suitable for the storage and display of greeting cards in connection with retail selling, although it is highly suitable for numerous other uses such as the display of various other articles of merchandise and the filing of documents of various kinds.

Other objects, advantages and details of the invention will be apparent as the description proceeds, reference being had to the accompanying drawing wherein several forms of the invention are shown. It will be understood that the description and drawing are illustrative only and that the scope of the invention is to be measured by the appended claims.

In the drawing:

Fig. 1 is a perspective view of a filing and display unit comprising three devices embodying the invention, the length of the devices being such as to accommodate, as illustrated, six individual pockets of reasonable size, the three devices being arranged in side-by-side manner;

Fig. 2 is a top plan view of one of the devices employed in the unit shown in Fig. 1, the index members being removed for clarity;

Fig. 3 is a sectional view on line 3—3 of Fig. 2;

Fig. 4 is a fragmentary top plan view of the forward part of the device shown in Fig. 2, the bottom portion being shown in an alternative shifted position;

Fig. 5 is an elevational view of an index member adapted to be used in the bottom portion shown in Figs. 1, 2, 3 and 4;

Fig. 6 is a fragmentary elevational view of a modified form of index member;

Fig. 7 is a fragmentary top plan view of an alternative form of bottom portion, the latter being designed to receive the index member of Fig. 6;

Fig. 8 is a fragmentary elevational view of still another form of index member, and Fig. 9 is a fragmentary top plan view of another form of bottom portion, the latter being designed to receive the index member of Fig. 8.

Referring now in detail to the drawing, the filing and display unit shown in Fig. 1 is designated generally by the numeral 10. The illustrated unit includes three side-by-side devices 11, 12 and 13.

The rear of unit 10 optionally is provided with shelves for the display of additional merchandise, there being shelves 14 and 15 in the illustrated example, and backing members 16 and 17.

Display device 11 includes a plurality of longitudinally spaced index members 20, 21, 22, 23, 24, 25 and 26. Each index member, as will be seen, has a hinged relationship with the bottom portion of the device. Adjacent index members define a pocket suitable for the reception of documents, merchandise and the like.

In device 11 of Fig. 1, index members 21 and 22 are shown in spaced apart relation, that is, member 21 has been rotated forwardly on its hinge and member 22 has been rotated rearwardly, thereby forming a pocket 28 in maximum size. Some four documents 29 are positioned in pocket 28 and it will be seen that the forward document is exposed for ready and full viewing. Normally the documents or merchandise are received loosely in the respective pockets so they can be removed conveniently in the event closer inspection is desired.

Each filing and display device of the Fig. 1 unit, such as devices 11, 12 and 13 of Fig. 1, comprises a tray structure having side elements 30 and 31, referring to device 13, front end element 32 and rear end element 33. The tray structure of device 13 also includes an upper bottom 35 and a lower common base 41 which is best shown in Fig. 3.

Referring to Figs. 2, 3 and 4, bottom 35 includes three side-by-side longitudinally extending panels completely defining a work supporting surface. These panels include a center panel 36 and a pair of outside panels 37 and 38. As seen in Figs. 2 and 3, these panels are all in a common plane to evenly distribute the weight carried by the work supporting surface.

The bottom panels are mounted in a simplified manner to permit relative longitudinal movement between center panel 36, on one hand, and the outside panels 37 and 38 on the other. Since all of the panels are side-by-side and parallel to each other in a common plane, the side edges of the fixed panels define guideways which help keep the shiftable panel or panels in longitudinal alignment with the fixed panels, see Fig. 2. If these panels were not mounted this way rather elaborate additional tracks or guideways would be necessary. In the form of the invention shown in Figs. 2, 3 and 4, the outside panels 37 and 38 are stationary while center panel 36 is longitudinally shiftable. The same is true of the modified form shown in Fig. 7, but in the modified form shown in Fig. 9 the center panel is stationary while the two outside panels are shiftable. In all cases, however, the panels are so mounted that the indicated relative longitudinal movement by at least two adjacent panels is possible.

The simplified mounting means includes a rear rod member 40 which rests on common base 41 and is integrally secured thereto. This member supports the rear ends of bottom panels 36, 37 and 38 in spaced parallel relation to common base 41. A similar member 42 is provided at the front ends of the panels, as shown in dotted line in Figs. 2 and 4. As previously mentioned, outside panels 37 and 38 are stationary and hence are secured, by any conventional means to the members 40 and 42. The center or lock panel 36, however, rests on members 40 and 42 and is free to slide longitudinally thereon. Since the center or lock panel is in the same plane as the outside panels, it has the added function of being part of the work supporting surface. To shift panel 36, finger hole 45 is provided.

Adjacent edges of the respective panels have opposed longitudinally spaced recesses wherein respective recesses are in transverse alignment complementing each other to form enlarged recesses or slots when center panel 36 is in a first shifted position, as shown in Fig. 4. Thus, the inner edges of panels 37 and 38, respectively, have a series of longitudinally spaced recesses 46 and 47, and both edges of center panel 36 have longitudinally spaced recesses 48 and 49. In the form of the invention shown in Figs. 1–5, the outer edges of outside panels 37 and 38 also are provided with longitudinally spaced recesses, namely recesses 50 and 51. As shown in Fig. 4, all the recesses 46—51 are in transverse alignment when center panel 36 is in its forwardly shifted position.

Conversely, when center panel 36 is in its rearwardly or second shifted position (as shown in Fig. 2), there is misalignment between inner recesses 46 and 47 in the outside panels and recesses 48 and 49 on the center panel resulting in a plurality of spaced parallel small recesses or slots. Recesses 50 and 51, of course, still retain their alignment with recesses 46 and 47.

Fig. 5 shows an example of the plurality of index members 55 which cooperate with the above described bottom 35.

Index member 55 has downwardly extending projections 56 and 57 terminating in enlarged portions or feet 58 and 59. These enlarged portions are smaller than the above described enlarged recesses, but are larger than the small recesses. For that reason when the panels are in the first position the enlarged portions are insertable in the set of transversely aligned enlarged recesses, as illustrated in Fig. 5. When center panel 36 is shifted to rear or second position as shown in Fig. 2, the misalignment of the panels, results in the small recesses in the adjacent panels being in spaced parallel relationship to each other so that the enlarged portions on the index member 55 can't be withdrawn. In this way the enlarged portions or feet are retained below the panel 36.

Index member 55 also is provided with downwardly extending lugs 60 and 61 which enter outer recesses 50 and 51 of outside panels 37 and 38. These lugs provide desirable reinforcement and receive some of the stresses imposed on index member 55 during use.

It will be noted that the respective recesses in the bottom panels have a substantial dimension in the longitudinal direction, thereby affording adequate room for proper hinge action of the index members without requiring the members themselves to bend. This, of course, contributes to prolonged life of the index members. The four-point contact relationship between the index members and the bottom maintains the index members against undesirable twisting, thereby contributing to overall stability.

The form of the invention shown in Figs. 6 and 7 is substantially the same as that previously described except that the lateral lugs 60 and 61 on the index member 55 are omitted on index member 55' along with the outer recesses 50 and 51 on the outside panels 37' and 38'. Although some lateral stability is sacrificed by the omission of the outside lugs and recesses, the form shown in Figs. 6 and 7 is highly satisfactory for many uses.

In the form of the invention shown in Figs. 8 and 9, the center panel of the upper bottom is formed from a plurality of spaced parallel strips 70 which are separated from each other to form slots or recesses 71. Each of these strips is rigidly secured to the common base 41 by nails or screws or any other conventional means. Outside panels 72 and 73 are provided with opposed recesses 74 and 75 along the inner edges respectively. In this form the recesses in the outside panels 72 and 73 are in rigid alignment with each other. Both panels 72 and 73 are ganged together by front and rear transverse connecting rod members 76. In this way panels 72 and 73 are simultaneously and longitudinally shiftable forwardly and rearwardly to obtain alignment and misalignment of the respective recesses. In Fig. 9 the outside panels are shown shifted forwardly to provide alignment, and they shift rearwardly to provide misalignment and locking.

An index member 80 for use with this form of the invention is shown in Fig. 8. It has a downwardly extended central lug 81 having oppositely extending feet 82 and 83. The feet enter recesses 74 and 75 respectively and are locked below panels 72 and 73 when the latter are shifted to rearward position.

In all forms of the invention it is desirable to employ some means to retain the shiftable bottom portion in index member-securing position so it will not be shifted accidentally. As one example of such means, a T-shaped member 85 is positioned so its stem fits between the front end of panel 36 and the front end element 32 when the panel 36 is in the second or rearmost position. The thickness of member 85 is such that it fills the space between the end of panel 36 and the front end element 32 so when the stem of member 85 is in the above described position the panel 36 cannot be shifted accidentally.

In those instances where it is desired to terminate the row of index members short of rear end element 33, the rearmost index member or element against which it rests may take the form of a suitably supported back-up block (not shown) of conventional design.

One characteristic of a filing and display device embodying this invention is extreme flexibility. By virtue of the locking arrangement for the index members the number and spacing of the index members may be varied over a wide range to provide the number and size of pockets desired. In all cases the index members have a desirable hinged relationship with the device bottom to facilitate viewing of the documents or merchandise contained in the respective pockets.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A filing and display device comprising a tray having side elements, end elements and a bottom, said bottom comprising a plurality of side-by-side longitudinal work supporting panels completely defining a work supporting surface, mounting means connected to said display device mounting said panels with their top surface in a common plane and with their adjacent longitudinal edges in guiding and abutting relationship, said panels being mounted for opposed longitudinal movement between a first and second position by at least two adjacent panels, the adjacent edges of said at least two adjacent panels having opposed longitudinally spaced transverse recesses, said recesses in said adjacent panels in alignment with each other when said panels are in said first position, whereby they complement each other to form a plurality of spaced parallel enlarged transverse recesses, said recesses in said adjacent panels out of alignment with each other when said panels are in said second position resulting in a plurality of spaced parallel small recesses, and a plurality of index members adapted to be mounted on said bottom, each of said index members having at least one downwardly extending projection, said projection terminating in an enlarged portion, said enlarged portion smaller than said enlarged recesses, but larger than said small recesses so that when said panels are in said first position, the enlarged portion on said projection may be inserted in one of said enlarged recesses, and when said panels are shifted to said second position, the enlarged portion on said index member will be too large to be withdrawn through the small recesses, whereby the index members are held to said bottom and the adjacent ones can form hinged pockets for filing and displaying the items placed therein.

2. The apparatus set forth in claim 1 wherein said bottom comprises a center panel and two outside panels, a common base for said display device, said mounting means holding said panels in spaced parallel relation to said common base.

3. The apparatus set forth in claim 2 wherein the thickness of said recesses is large in comparison to the thickness of said enlarged portions to afford adequate room for the pivoting hinge action of the index members.

4. The apparatus set forth in claim 2 wherein said mounting means includes spaced parallel rods, said rods rigidly secured to the front and rear ends of the common base of said display device in spaced parallel relation to each other, the two outside panels rigidly secured to the top surface of said rods and supported thereby, said center panel in slidable longitudinally shiftable engagement with the top surface of said rods.

5. The combination of claim 2 wherein said center panel is longitudinally shiftable and said two outside panels are fixed in position.

6. The combination of claim 2 wherein said center panel is longitudinally shiftable and said two outside panels are fixed in position and wherein the outer edges of said two outside panels have recesses in alignment with said recesses in the inner edges of said two outside panels, the said index members having downward lugs extending through said outer edge recesses.

7. The combination of claim 2 wherein said center panel is fixed in position and the recesses thereof are transversely continuous to form a slot and wherein said two outside panels are longitudinally shiftable.

8. The combination of claim 7 wherein said two outside panels are ganged together for simultaneous shifting.

References Cited in the file of this patent

UNITED STATES PATENTS

| | | |
|---|---|---|
| 668,114 | McNeal | Feb. 12, 1901 |

FOREIGN PATENTS

| | | |
|---|---|---|
| 116,632 | Sweden | June 25, 1946 |